United States Patent
Stewart et al.

(10) Patent No.: US 7,042,839 B2
(45) Date of Patent: May 9, 2006

(54) SCALEABLE LINE-BASED PROTECTION FOR CONNECTION ORIENTED COMMUNICATIONS PROTOCOLS

(75) Inventors: Mark A. W. Stewart, Acton, MA (US); David Peck, Northbridge, MA (US)

(73) Assignee: Fujitsu Limited, Kanagawa-ken (JP)

( * ) Notice: Subject to any disclaimer, the term of this patent is extended or adjusted under 35 U.S.C. 154(b) by 987 days.

(21) Appl. No.: 10/071,712

(22) Filed: Feb. 7, 2002

(65) Prior Publication Data

US 2003/0147344 A1  Aug. 7, 2003

(51) Int. Cl.
*H04L 1/22* (2006.01)

(52) U.S. Cl. .......................... 370/227; 370/228; 398/5
(58) Field of Classification Search ................. 370/217, 370/221, 222, 223, 225, 227, 228; 398/2, 398/3, 4, 5
See application file for complete search history.

(56) References Cited

U.S. PATENT DOCUMENTS

| | | | | |
|---|---|---|---|---|
| 4,956,835 A | 9/1990 | Grover | ......................... | 370/16 |
| 5,146,452 A | 9/1992 | Pekarske | ..................... | 370/16 |
| 5,179,548 A | 1/1993 | Sandesara | ................... | 370/16.1 |
| 5,835,482 A | 11/1998 | Allen | ......................... | 370/225 |
| 6,047,331 A | 4/2000 | Medard et al. | ............. | 709/239 |
| 6,163,525 A | 12/2000 | Bentall et al. | .............. | 370/227 |
| 2002/0167899 A1* | 11/2002 | Thompson et al. | ......... | 370/222 |
| 2002/0172149 A1* | 11/2002 | Kinoshita et al. | ........... | 370/216 |
| 2002/0181503 A1* | 12/2002 | Montgomery | ............... | 370/468 |
| 2003/0018812 A1* | 1/2003 | Lakshminarayana et al. | .... | 709/241 |
| 2005/0207337 A1* | 9/2005 | Oda et al. | ................... | 370/214 |

* cited by examiner

*Primary Examiner*—Melvin Marcelo
(74) *Attorney, Agent, or Firm*—Weingarten, Schurgin, Gagnebin & Lebovici LLP

(57) ABSTRACT

A scalable protection method for connection oriented networks includes a source, a destination, and primary nodes interconnected by working path segments between the source and destination. A point-to-multipoint connection with multiple destinations and additional primary nodes is also supported. Each of a number of backup nodes is interconnected with an associated primary node by pre-provisioned shunt segments, and the backup nodes are interconnected among themselves by pre-provisioned protection path segments. Upon occurrence of a failure, the primary node upstream of the failure directs input traffic to a shunt segment, and the backup node associated with the upstream primary node directs traffic from the shunt segment to an output protection segment. Downstream of the failure, a backup node directs traffic from an input protection segment to a shunt segment, and the primary node associated with the backup node directs the traffic from the shunt segment to a downstream working segment. In this manner, traffic is routed around failures via local switching operations.

13 Claims, 5 Drawing Sheets

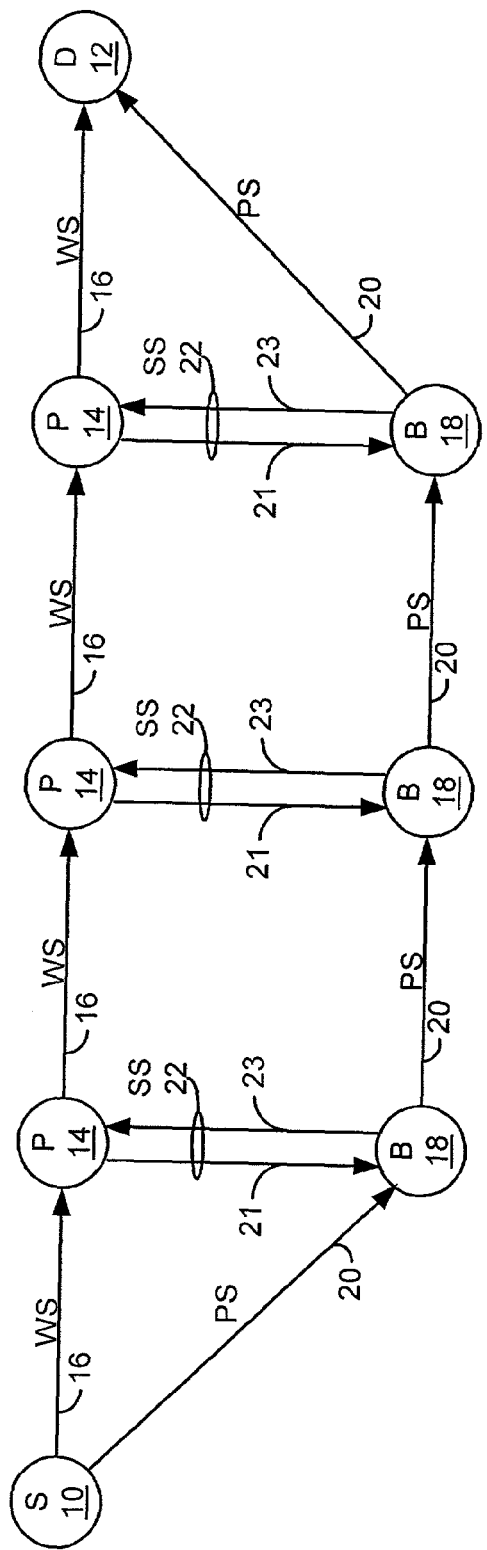
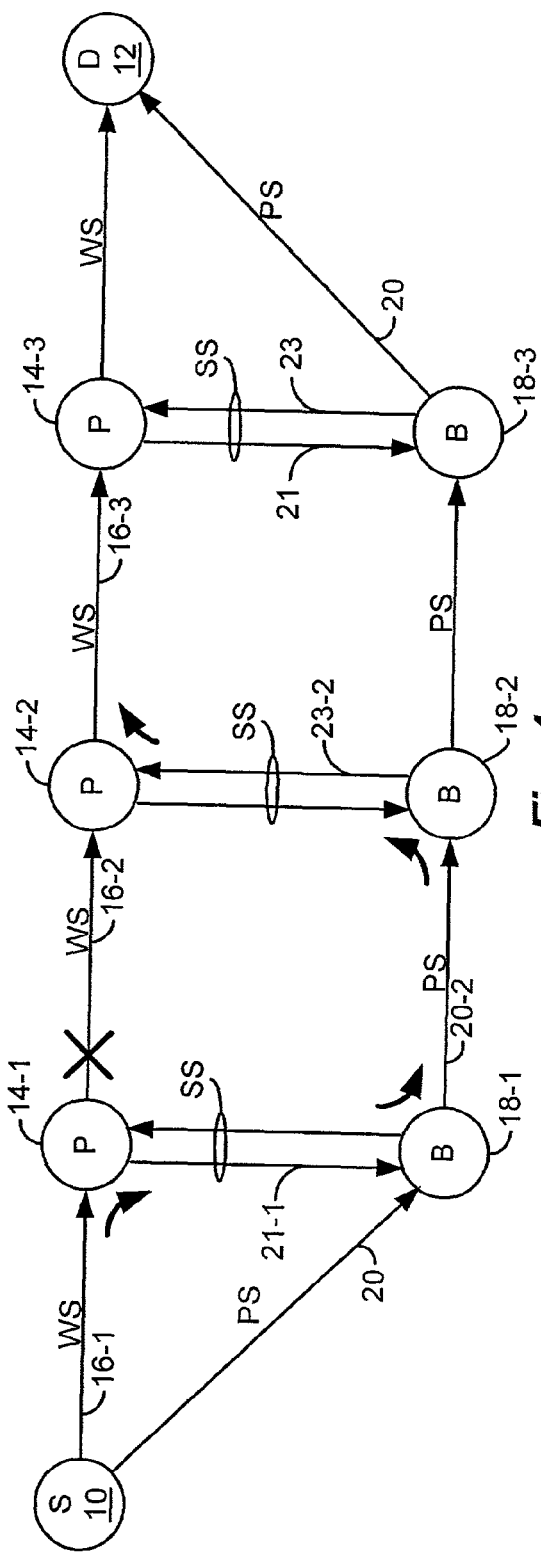

SCALEABLE LINE-BASED PROTECTION FOR CONNECTION ORIENTED COMMUNICATIONS PROTOCOLS

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention is related to the field of protection switching in data communications networks.

Many data communications networks employ some form of protection switching to provide better availability of communications services to customers than can be provided by unprotected networks. Generally, protection switching involves the detection of failures within the network, the communication of the failure information to nodes that are affected by a detected failure, and the switching of traffic from one path or connection to another path or connection at the affected nodes as dictated by a predetermined protection switching scheme.

In so-called connection-oriented networks, which employ pre-established virtual and/or physical connections for carrying user data traffic, one class of protection switching schemes is known as "line-based" protection switching. In contrast to source-based schemes, in which traffic is re-routed at its source upon occurrence of a failure and may take a completely different path to its destination, line-based schemes involve more local or hop-by-hop protection switching decisions. Thus, if an end-to-end connection includes a number of intermediate nodes and connection segments and line-based protection switching is utilized, one or more of the intermediate nodes respond to a failure by taking local actions to re-route the traffic around the failure, without necessarily involving either the source or destination in the protection action. Line-based protection switching can reduce the disruption that can be caused by failures, and under some circumstances may be faster and more efficient than source-based protection switching.

Common examples of both source-based and line-based protection schemes are found in Synchronous Optical Network (SONET) networks. A SONET ring can employ unidirectional path switched ring (UPSR) protection switching or bidirectional line-switched ring (BLSR) protection switching. In UPSR protection switching, information about a failure must be propagated to the destination node, which responds by switching to accept data already flowing on a protect path separate from the working path. However, the destination node may be many hops away from the failure, potentially resulting in a long switchover delay and concomitant loss of data. In BLSR protection switching, the failure information must be propagated to every node on the ring to enable affected traffic to be re-routed in the opposite direction from source to destination, and then each node must perform the necessary switching. In either case, protection switching may be undesirably slow and/or inefficient. Additionally, these techniques suffer relatively poor scalability due to their reliance on relatively wide-area communication of failures and initiation of protection switching actions.

A protection switching technique having improved speed, efficiency and scalability is desirable.

BRIEF SUMMARY OF THE INVENTION

In accordance with the present invention, a scalable protection method for connection oriented networks is disclosed in which protection switching actions are generally taken locally based on pre-established protection connection segments, resulting in improved speed and efficiency in protection switching operations.

The disclosed protected network includes a source and destination, and primary nodes interconnected by working path segments between the source and destination. A number of backup nodes are interconnected by pre-provisioned protection path segments between the source and the destination, and each backup node is also interconnected with an associated primary node by a bidirectional set of pre-provisioned shunt segments.

Each primary node, under normal working circumstances, directs input traffic from an upstream working path segment to a downstream working path segment. Upon occurrence of a failure on the upstream working path segment, a primary node directs input traffic from an input shunt segment to the downstream working path segment, and upon occurrence of a failure on the downstream working path segment, directs input traffic from the upstream working path segment to an output shunt segment.

Each backup node, upon occurrence of a failure on the downstream working path segment of the associated primary node, directs input traffic from an input shunt segment to a downstream protection path segment, and upon occurrence of a failure on the upstream working path segment of the associated primary node, directs input traffic from an upstream protection path segment to an output shunt segment. Additionally if the associated primary node itself fails, the backup node directs input traffic from an upstream protection path segment to a downstream protection path segment.

As a result of these combined operations of the primary and backup nodes when failures occur, new paths are created including shunt segments and protection segments that bypass the failures. Because the shunt and protection segments are pre-provisioned, protection switching is performed rapidly and efficiently. Additionally, the technique is scalable. As primary nodes are added in a network, additional backup nodes and shunt and protection segments can be added in an incremental fashion. Protection switching can be performed in a relatively small neighborhood of a failure, rather than requiring larger-scale communication and switching responses as in present protection architectures.

Other aspects, features, and advantages of the present invention will be apparent from the detailed description that follows.

BRIEF DESCRIPTION OF THE SEVERAL VIEWS OF THE DRAWING

The invention will be more fully understood by reference to the following Detailed Description of the invention in conjunction with the Drawing, of which:

FIG. 1 is a block diagram of a network incorporating line based protection in accordance with the present invention;

FIG. 4 is a block diagram of the network of FIG. 1 in the presence of a failure on a working network segment;

DETAILED DESCRIPTION OF THE INVENTION

Figure 2:
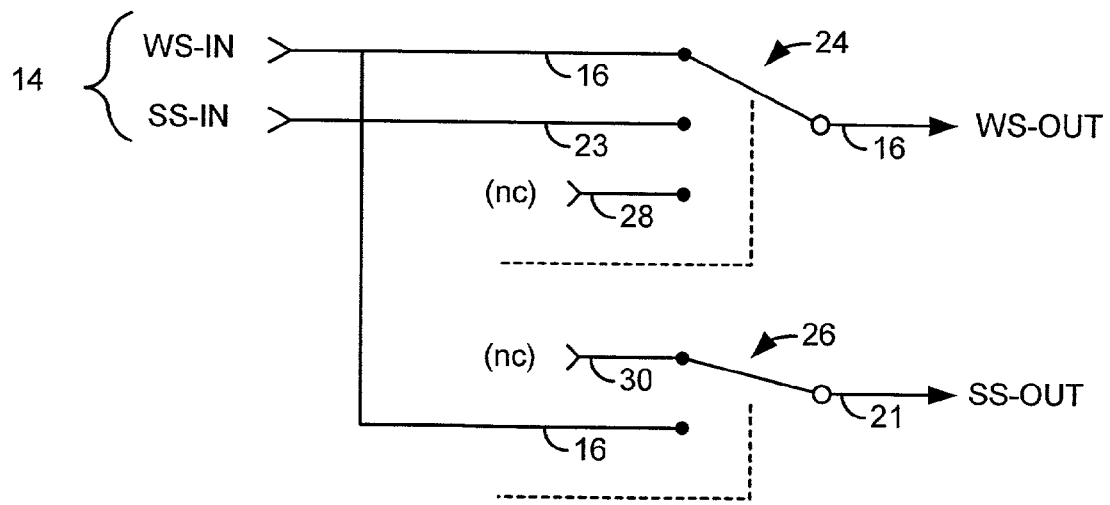
FIG. 2 is a block diagram of switching circuitry in a primary node in the network of FIG. 1.

FIG. 1 shows a portion of an exemplary network for enabling protected unidirectional communication between a source node (S) 10 and a destination node (D) 12. The primary or working communication path includes a number of intermediate nodes designated "primary" nodes (P) 14 interconnected by working segments (WS) 16. Also shown are a set of backup nodes (B) 18, each being associated with a corresponding one of the primary nodes 14. The backup nodes 18 are interconnected between the source node 10 and the destination node 12 by a number of protection segments (PS) 20. Also, each backup node 18 is interconnected with the associated primary node 14 by a corresponding pair of shunt segments (SS) 22. Each pair 22 includes a first shunt segment 21 for carrying traffic from a primary node 14 to the associated backup node 18, and a second shunt segment 23 for carrying traffic from a backup node 18 to the associated primary node 14.

The various segments 16, 20 and 22 are established at the time of connection setup, in advance of carrying any user data traffic from the source node 10 to the destination node 12. The path consisting of the working segments 16 through the primary nodes 14 is a unidirectional path for carrying working traffic from the source node 10 to the destination node 12, and the protection segments 20 are designated to carry protection traffic in the same direction. It will be appreciated that the nodes 10 and 12 may exchange data traffic in the other direction as well (i.e. from node 12 to node 10), for which a separate set of working and protection segments (not shown) must be established. In general, the segments utilized for traffic in the other direction may flow through a different set of primary nodes, although in practice it is generally advantageous for traffic in both directions to traverse the same set of nodes. Also, a given shunt segment 22 may serve to protect traffic flowing in both directions. In one embodiment, the segments 16, 20, and 22 can be realized as label-switched paths (LSPs) as known in the Multiprotocol Label Switching (MPLS) architecture. They may also be realized as virtual connections (VCs) such as defined in the Asynchronous Transfer Mode (ATM) architecture, or similar pre-established connections.

FIG. 2 shows circuitry used for protection switching within the primary nodes 14. First selection circuit 24 selects the source for traffic sent from the primary node 14 on its downstream or output working segment 16, shown as "WS-OUT", and second selection circuit 26 selects the source for traffic sent from the primary node 14 on its output shunt segment 21, shown as "SS-OUT". The inputs to the first selection circuit 24 are (1) the upstream or input working segment 16 ("WS-IN"), (2) the as "nc") When no connection 28 is selected, the output working segment 16 is not being utilized to carry traffic. This case corresponds to the presence of a failure downstream of the primary node 14, as explained below.

The inputs to the second selection circuit 26 are (1) "no connection" 30 and (2) the upstream or input working segment 16 ("WS-IN"). When no connection 30 is selected, the output shunt segment 21 is not being utilized to carry traffic. This case corresponds to the normal working condition, as explained below.

Figure 3:
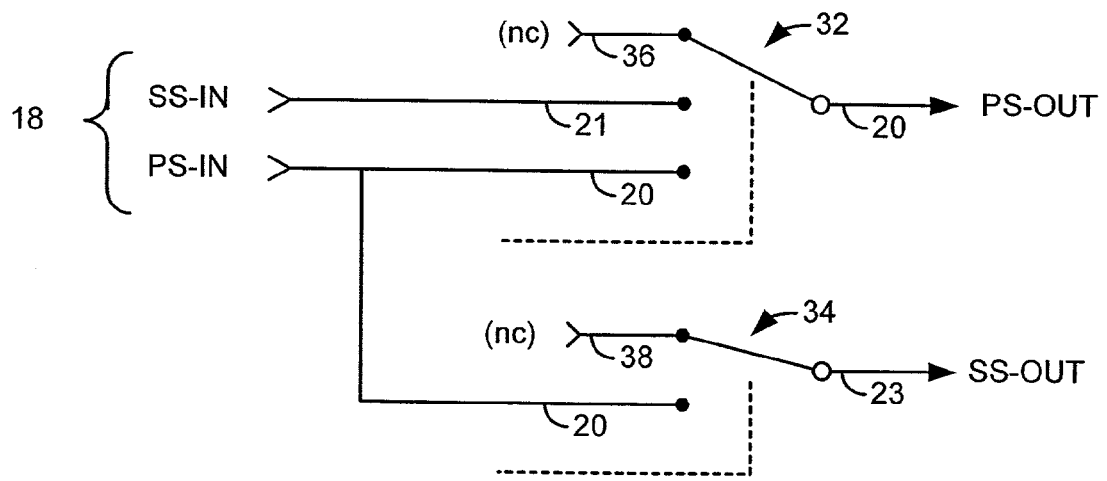
FIG. 3 is a block diagram of switching circuitry in a backup node in the network of FIG. 1.

FIG. 3 shows circuitry used for protection switching within the backup nodes 18. First selection circuit 32 selects the source for traffic sent from the backup node 18 on its downstream or output protection segment 20, shown as "PS-OUT", and second selection circuit 34 selects the source for traffic sent from the backup node 18 on its output shunt segment 23, shown as "SS-OUT". The inputs to the first selection circuit 32 are (1) "no connection" 36, (2) the input shunt segment 21 ("SS-IN"), and (3) the input protection segment 20 ("PS-IN"). When no connection 36 is selected, the output protection segment 20 is not being utilized to carry traffic. This case corresponds to the normal working condition, as explained below. The inputs to the second selection circuit 34 are (1) "no connection" 38 and (2) the upstream or input protection segment 20 ("PS-IN"). When no connection 38 is selected, the output shunt segment 23 is not being utilized to carry traffic. This case corresponds to the normal working condition, as explained below.

The circuitry of FIGS. 2 and 3 is used for protection switching when necessitated by failures within the network. In general, a given backup node 18 and associated protection segments 20 and shunt segments 22 are utilized to route traffic around a failure at or near the primary node 14 with which the given backup node 18 is associated. Specific examples of such failures are given below. From the perspective of a given primary node 14, failures can be categorized as having occurred at the primary node 14 itself, "upstream" of the primary node 14, i.e. toward the source node 10, or "downstream" of the primary node 14, i.e., toward the destination node 12. A failure of a primary node 14 itself is considered to be downstream of a working upstream primary node 14, and upstream of a working downstream primary node 14. This specific scenario is also described below.

Tables 1 and 2 summarize the operation of the switch circuits 24, 26, 32 and 34 at a primary node 14 and associated backup node 18 based on the existence of and relative location of a failure. The contents of these tables are explained below.

TABLE 1

Switch Circuits at Primary Node

| Case | WS-OUT | SS-OUT |
|---|---|---|
| Working | WS-IN | nc |
| Failure-upstream | SS-IN | nc |
| Failure-downstream | nc | WS-IN |

TABLE 2

Switch Circuits at Backup Node

| Case | PS-OUT | SS-OUT |
|---|---|---|
| Working | nc | nc |
| Failure-upstream | nc | PS-IN |
| Failure-downstream | SS-IN | nc |
| Failure-primary node | PS-IN | nc |

Tables 1 and 2 are explained as follows. At a primary node 14, in the absence of a failure, the traffic from WS-IN is passed along to WS-OUT, and no traffic is sent on SS-OUT, because protection is not active due to the absence of a failure. When a failure occurs upstream of the primary node 14, traffic is still sent on WS-OUT, but the source is the associated backup node 18 via SS-IN. When a failure occurs downstream of the primary node 14, traffic is still received from WS-IN, but is sent to the associated backup node 18 via SS-OUT rather than being forwarded along the working path via WS-OUT. Recall that from the perspective of a given primary node 14, the failure of another primary node 14 is either an upstream or downstream failure, depending on its relative location.

At a backup node 18 (Table 2), in the absence of a failure, no traffic is sent on either PS-OUT or SS-OUT. This is an idle or standby condition. When a failure occurs upstream of the associated primary node 14, the backup node 18 accepts traffic from PS-IN and directs it to the associated primary node 14 via SS-OUT. When a failure occurs downstream of the associated primary node 14, the backup node 18 accepts traffic from SS-IN and directs it along the protection path via PS-OUT. When the primary node 14 associated with the backup node 18 fails, then traffic is accepted from PS-IN and directed along the protection path via PS-OUT.

FIG. 4 depicts the operation of the network in the presence of a failure on the working segment 16-2 extending between two primary nodes 14-1 and 14-2. At the primary node 14-1, the traffic is directed from the input working segment 16-1 toward the backup node 18-1 along the shunt segment 21-1. The backup node 18-1 accepts the traffic from the shunt segment 21-1 and directs the traffic toward the downstream backup node 18-2 along the protection segment 20-2. From the perspective of the backup node 18-2 and the primary node 14-2, the failure is an "upstream" failure. Therefore, the backup node 18-2 directs traffic from the protection segment 20-2 toward the primary node 14-2 via the shunt segment 23-2, and the primary node 14-2 accepts the traffic from the shunt segment 23-2 and directs it to primary node 14-3 via the working segment 16-3.

Figure 5:
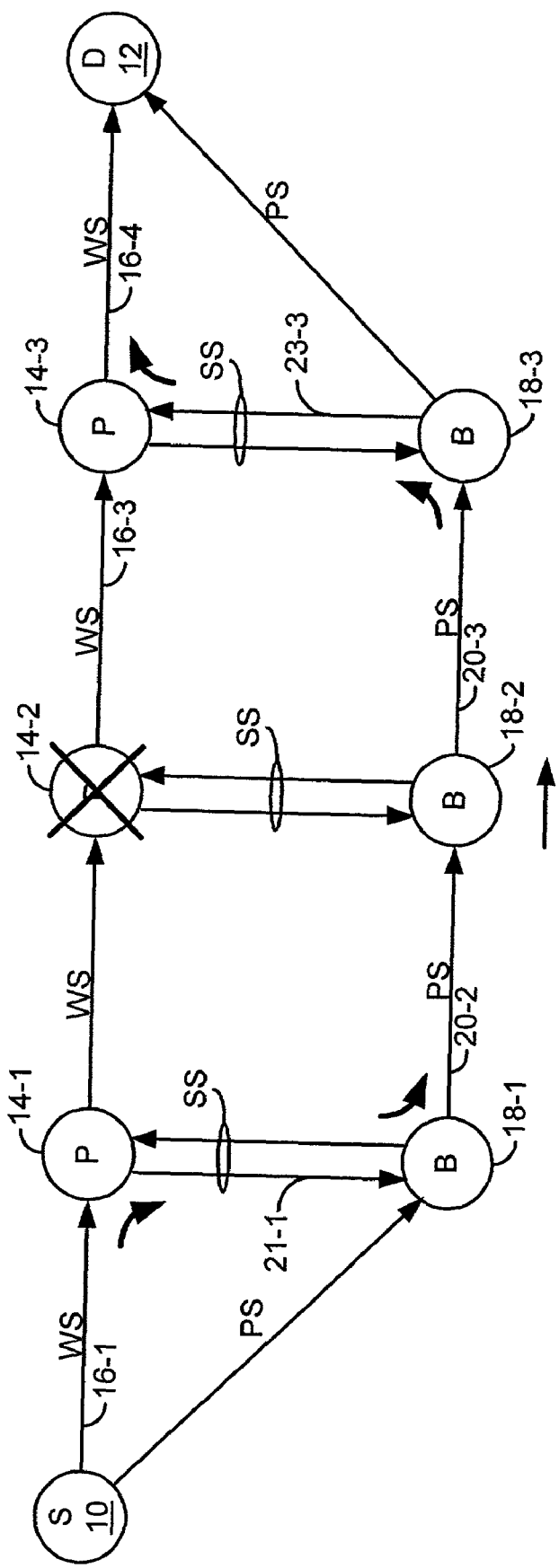
FIG. 5 is a block diagram of the network of FIG. 1 in the presence of a failure of a primary node.

FIG. 5 shows operation when a primary node such as primary node 14-2 fails. In this case, operation of nodes 14-1 and 18-1 is the same as for the situation of FIG. 4, and nodes 14-3 and 18-3 operate in the same fashion as do nodes 14-2 and 18-2 in the situation of FIG. 4. Additionally, backup node 18-2 forwards traffic from its input protection segment 20-2 toward the downstream backup node 18-3 via output protection segment 20-3. As a result, traffic is routed around failed primary node 14-2.

The preceding description has focused on point-to-point connections having one source node 10 and one destination node 12. The disclosed protection technique can also be utilized in connection with point-to-multipoint connections having a single source and multiple destinations.

Figure 6:
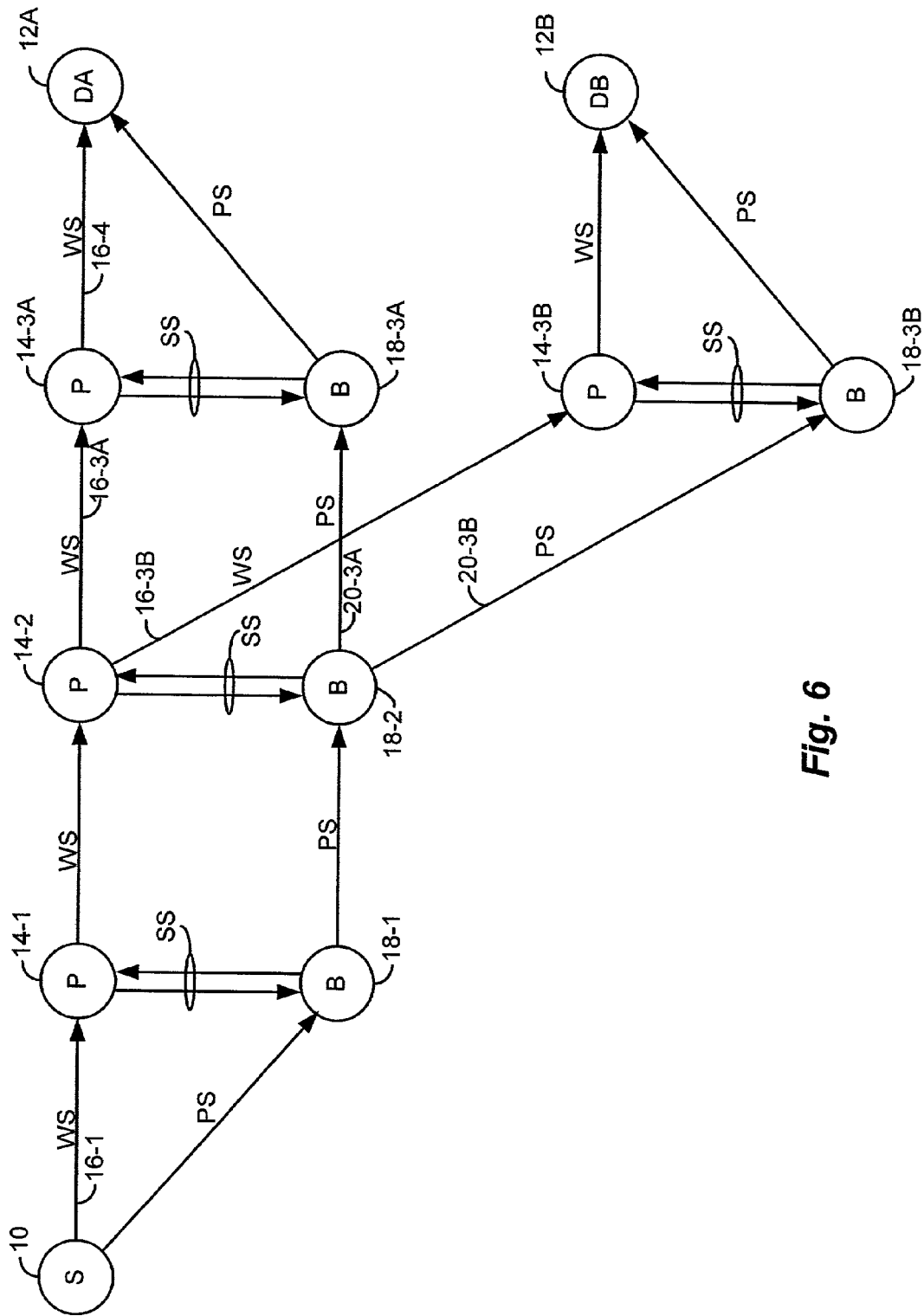
FIG. 6 is a block diagram of a network incorporating line based protection of a point-to-multipoint connection in accordance with the present invention.

FIG. 6 shows an example of a point-to-multipoint connection on which the source node 10 sends data to two different destinations 12A and 12B. In this simple two-destination connection, the primary node 14-2 is responsible for replicating the traffic on two output working segments 16-3A and 16-3B, and likewise the backup node 18-2 is responsible for replicating the traffic on two output protection segments 20-3A and 20-3B. The nodes 14-2 and 18-2 are referred to herein as a "branching primary node" and "branching backup node" respectively. The nodes 14-2 and 18-2 operate as shown in FIGS. 2 and 3 with respect to both the traffic stream for destination 16A and the traffic stream for destination 16B. Generally, it is preferred that the protection switching for these different streams be carried out independently, so that for example a failure of primary node 14-3B would result in protection switching occurring for the traffic for destination 12B but no protection switching occurring for the traffic for destination 12A.

Figure 7:
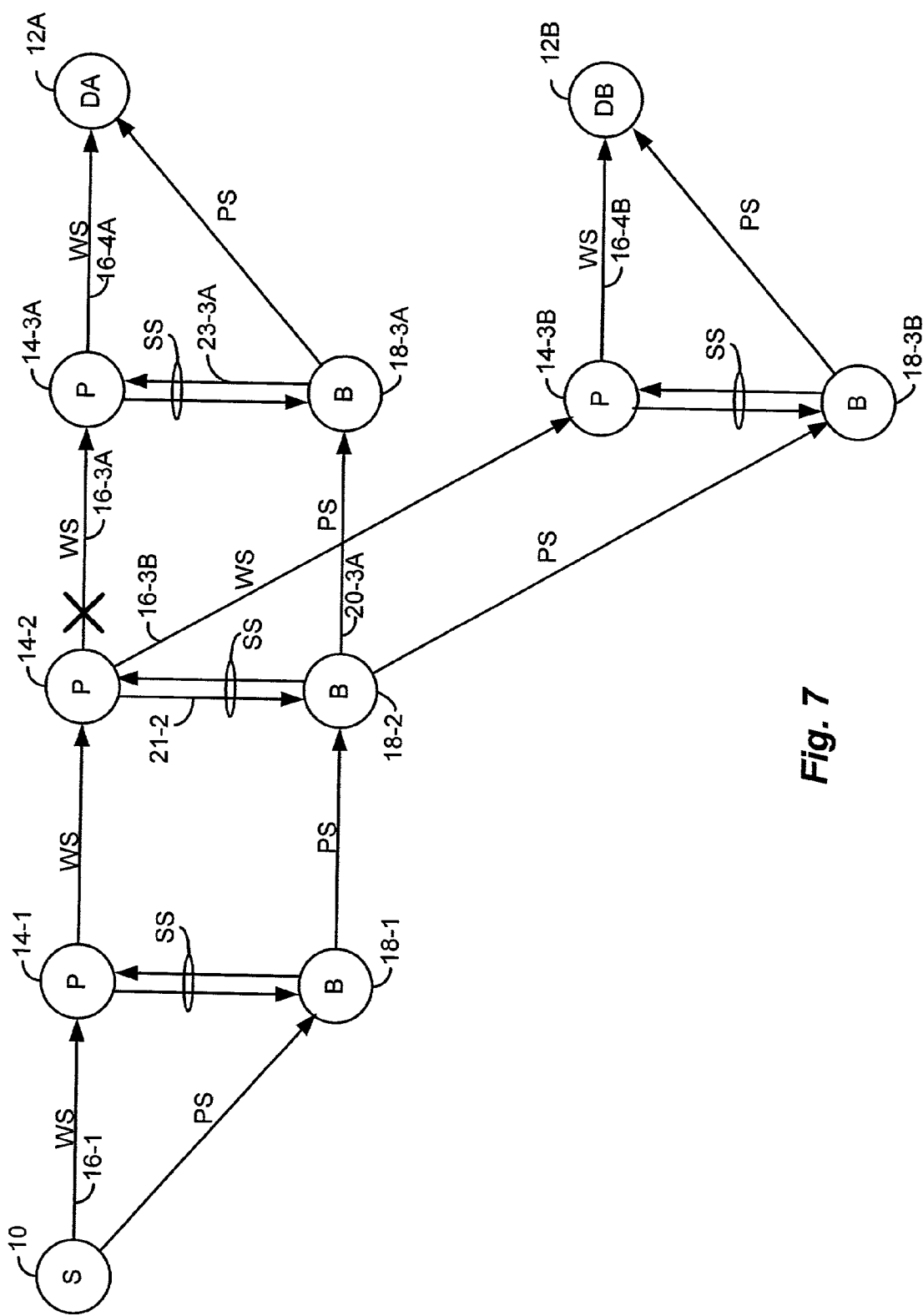
FIG. 7 is a block diagram of the network of FIG. 6 in the presence of a failure on a working network segment.

FIG. 7 shows the existence of a failure on the working segment 16-3A of the "A" branch of the point-to-multipoint connection. In this case, the traffic destined for destination node 12A is directed along shunt segment 21-2 to backup node 18-2, then along protection segment 20-3A to backup node 18-3A, and then along shunt segment 23-3A to primary node 14-3A, which forwards the traffic to destination node 12A along working segment 14-4. The traffic destined for destination node 12B is not affected by this failure, and continues to flow along working segments 16-3B and 16-4B.

While in the illustrated embodiments, there is a different backup node 18 associated with each primary node 14, in alternative embodiments a node may serve as a backup node 18 for two or more primary nodes 14, as long as the necessary working segments, protection segments, and shunt segments can be established. It is generally preferred for reliability reasons that a primary node be directly connected to its associated backup node, although it is not strictly required. By "directly connected", it is meant that there are no intervening nodes that terminate network segments such as LSPs. A lower-level device such as an electrical repeater or hub would generally not qualify as an intervening node. As already mentioned, there may be additional nodes within one or more of the protection segments 20 that do not participate in the protection operation as a backup node 18. Additionally, it is possible that such additional nodes are also included within the working segments 16, although such configurations are preferably avoided. Generally, it is preferred that each node along the working path from source 10 to destination 12 be protected.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A protected network, comprising:
    a plurality of primary nodes interconnected by a set of pre-provisioned working path segments between a source and a destination; and
    a plurality of backup nodes interconnected by a set of pre-provisioned protection path segments between the source and the destination, each backup node also being interconnected with an associated one of the primary nodes by a corresponding one of a set of pre-provisioned, bidirectional shunt segments;
    wherein:
        each primary node is operative, (i) under normal working circumstances, to direct input traffic from an upstream working path segment to a downstream working path segment, (ii) upon occurrence of a failure on the upstream working path segment, to direct input traffic from an input shunt segment to the downstream working path segment, and (iii) upon occurrence of a failure on the downstream working path segment, to direct input traffic from the upstream working path segment to an output shunt segment; and
        each backup node is operative, (i) upon occurrence of a failure on the downstream working path segment of the associated primary node, to direct input traffic from an input shunt segment to a downstream protection path segment, and (ii) upon occurrence of a failure on the upstream working path segment of the associated primary node, to direct input traffic from an upstream protection path segment to an output shunt segment.

2. A protected network according to claim 1, wherein each backup node is further operative, upon occurrence of a failure of the associated primary node, to direct input traffic from an upstream protection segment to a downstream protection path segment.

3. A protected network according to claim 1, wherein the working segments, protection segments, and shunt segments comprise label-switched paths.

4. A protected network according to claim 1, wherein each primary node is associated with a different one of the backup nodes.

5. A protected network according to claim 1, wherein at least two of the primary nodes are associated with the same one of the backup nodes and interconnected thereto by corresponding ones of the shunt segments.

6. A protected network according to claim 1, wherein each primary node is directly connected to the associated backup node without any intervening nodes capable of terminating network segments.

7. A protected network according to claim 1, wherein the destination is a first one of at least two destinations for traffic generated by the source, and further comprising (i) an additional primary node interconnected by additional pre-provisioned working path segments between a branching one of the primary nodes and a second one of the destinations, and (ii) an additional backup node interconnected by additional pre-provisioned protection path segments between a branching one of the backup nodes and the second destination, the additional backup node also being interconnected with the additional primary node by a corresponding additional shunt segment, and wherein the additional primary and backup nodes and the branching primary and backup nodes are respectively operative in a manner similar to the other primary and backup nodes to effect protection switching of traffic from the source to the second destination.

8. A method of operating a protected network including a plurality of primary nodes interconnected by a set of pre-provisioned working path segments between a source and a destination, comprising:

interconnecting a plurality of backup nodes by a set of pre-provisioned protection path segments between the source and the destination, and further interconnecting each backup node with a corresponding one of the primary nodes by a corresponding one of a set of pre-provisioned, bidirectional shunt segments;

at each primary node, (i) under normal working circumstances, directing input traffic from an upstream working path segment to a downstream working path segment, (ii) upon occurrence of a failure on the upstream working path segment, directing input traffic from an input shunt segment to the downstream working path segment, and (iii) upon occurrence of a failure on the downstream working path segment, directing input traffic from the upstream working path segment to an output shunt segment; and at each backup node, (i) upon occurrence of a failure on the downstream working path segment of the associated primary node, directing input traffic from an input shunt segment to a downstream protection path segment, and (ii) upon occurrence of a failure on the upstream working path segment of the associated primary node, directing input traffic from an upstream protection path segment to an output shunt segment.

9. A method according to claim 8, further comprising at each backup node, upon occurrence of a failure of the associated primary node, directing input traffic from an upstream protection segment to a downstream protection path segment.

10. A method according to claim 8, wherein the working segments, protection segments, and shunt segments comprise label-switched paths.

11. A method according to claim 8, wherein each primary node is associated with a different one of the backup nodes.

12. A method according to claim 8, wherein at least two of the primary nodes are associated with the same one of the backup nodes and interconnected thereto by corresponding ones of the shunt segments.

13. A method according to claim 8, wherein each primary node is directly connected to the associated backup node without any intervening nodes capable of terminating network segments.

* * * * *

UNITED STATES PATENT AND TRADEMARK OFFICE
CERTIFICATE OF CORRECTION

PATENT NO. : 7,042,839 B2
APPLICATION NO. : 10/071712
DATED : May 9, 2006
INVENTOR(S) : Mark A. W. Stewart et al.

It is certified that error appears in the above-identified patent and that said Letters Patent is hereby corrected as shown below:

Column 3, line 63, "(2) the as "nc)" should read --(2) the input shunt segment 23 ("SS-IN") and (3) "no connection" 28 (shown as "nc").--.

Signed and Sealed this

Twenty-seventh Day of February, 2007

JON W. DUDAS
*Director of the United States Patent and Trademark Office*